US007174107B2

(12) United States Patent
Boroditsky et al.

(10) Patent No.: US 7,174,107 B2
(45) Date of Patent: Feb. 6, 2007

(54) METHOD AND APPARATUS FOR MEASURING FREQUENCY-RESOLVED STATES OF POLARIZATION OF A WORKING OPTICAL CHANNEL USING POLARIZATION-SCRAMBLED HETERODYNING

(75) Inventors: Mikhail Boroditsky, South Amboy, NJ (US); Mikhail Brodsky, Milbourn, NJ (US); Nicholas J. Frigo, Little Silver, NJ (US); Peter Magill, Freehold, NJ (US)

(73) Assignee: AT&T Corp., New York, NY (US)

( * ) Notice: Subject to any disclaimer, the term of this patent is extended or adjusted under 35 U.S.C. 154(b) by 375 days.

(21) Appl. No.: 10/825,529

(22) Filed: Apr. 15, 2004

(65) Prior Publication Data

US 2005/0232640 A1    Oct. 20, 2005

(51) Int. Cl.
 *H04B 10/00* (2006.01)
(52) U.S. Cl. ......................................... 398/152; 398/29
(58) Field of Classification Search ........ 398/205–206, 398/28–29, 152, 159
See application file for complete search history.

(56) References Cited

U.S. PATENT DOCUMENTS

| 5,717,489 | A | 2/1998 | Ozeki et al. |
| 5,930,414 | A | 7/1999 | Fishman et al. |
| 5,995,228 | A | 11/1999 | Otani et al. |
| 6,380,533 | B1 | 4/2002 | Jopson et al. |
| 6,381,385 | B1 | 4/2002 | Watley et al. |
| 6,459,830 | B1 | 10/2002 | Pua et al. |
| 6,542,650 | B2 | 4/2003 | Khosravani et al. |
| 6,556,732 | B1 | 4/2003 | Chowdhury et al. |
| 6,563,590 | B2 * | 5/2003 | Chowdhury et al. ........ 356/484 |
| 6,647,176 | B1 | 11/2003 | Pua et al. |
| 6,885,783 | B2 * | 4/2005 | Bandemer et al. ............ 385/11 |
| 2003/0156776 | A1 | 8/2003 | Ki-Ho et al. |
| 2003/0175034 | A1 | 9/2003 | Reinhld |
| 2003/0184735 | A1 | 10/2003 | Klaus et al. |

(Continued)

FOREIGN PATENT DOCUMENTS

WO        WO 200167649 A1 *   9/2001

OTHER PUBLICATIONS

IEEE Xplore AbstractPlus corresponding to Boroditsky, M. et al. "In-service measurements of polarization-mode dispersion and correlation to bit-error rate."*

(Continued)

*Primary Examiner*—Christina Leung
(74) *Attorney, Agent, or Firm*—Hoffmann & Baron, LLP

(57) ABSTRACT

An apparatus for measuring a set of frequency-resolved states of polarization (SOP) of an optical signal includes a local oscillator (LO), a polarization scrambler, a coupler for mixing the polarization-scrambled signal with the optical signal to produce a heterodyned signal with a radio frequency (RF) component, and an analyzer for passing a fixed polarization component and resolving the polarization and frequency from the RF component. The apparatus is used for measuring, monitoring or compensating the polarization mode dispersion (PMD) in a working channel of an optical telecommunication system. A method for measuring frequency-resolved SOP of an optical signal includes tuning and polarization-scrambling a local oscillator (LO), mixing the scrambled LO with the optical signal, and resolving the RF signal in frequency and polarization. The method is applied to measure and monitor PMD in a working optical channel, and to dynamically compensate for the PMD.

23 Claims, 4 Drawing Sheets

OTHER PUBLICATIONS

M. Boroditsky, et al., "In-Service Measurements of Polarization-Mode Dispersion and Correlation to Bit-Error Rate", *IEEE Phot. Tech. Lett.*, vol. 15, No. 4, pp. 572-574 (Apr. 2003).

Normand Cyr, Andre Girard, and Gregory W. Schinn, "Stokes Parameter Analysis Method, the Consolidated Test Method for PMD Measurements", *NFOEC '99 Convention* (Chicago, Ill. 1999).

* cited by examiner

METHOD AND APPARATUS FOR MEASURING FREQUENCY-RESOLVED STATES OF POLARIZATION OF A WORKING OPTICAL CHANNEL USING POLARIZATION-SCRAMBLED HETERODYNING

FIELD OF THE INVENTION

The invention relates to the field of high-speed optical telecommunication systems, and more particularly to a method and apparatus for measuring the frequency-resolved states of polarization of a working optical telecommunication channel.

BACKGROUND OF THE INVENTION

The optical waveguides or fibers used to transmit signals in optical telecommunication systems are characterized, in part, by the vector property of polarization mode dispersion (PMD). Polarization mode dispersion occurs as a result of birefringence in the fiber, which may be caused by physical asymmetry in the fiber construction itself, or by stress, strain, or other external forces imposed on the fiber. Optical fibers display an anisotropy in the refractive index, which will vary as a function of position along the fiber and as a function of time. In addition, random polarization coupling can occur, giving rise to time-varying birefringence statistics. Consequently, different polarization components of an optical signal will propagate at different velocities, resulting in a differential group delay (DGD) between the components, and causing significant broadening of the optical pulses propagating along long lengths of fiber.

PMD is widely recognized as a potential limiting factor in high-speed optical telecommunication systems. In particular, PMD is a statistical quantity that changes with time in response to environmental conditions. In order to mitigate the effects of DGD and prevent service outage due to rising DGD or a bad launch polarization state, therefore, it is important to monitor PMD itself, as well as its impact on the system. This type of a measurement implies that the output state of polarization is measured at different frequencies. The measurement is typically done by scanning a tunable laser that is coupled to a dark fiber and characterizing the polarization of the optical signal output from the fiber as a function of frequency. Dark fiber is optical fiber that is in place but not currently in use as a carrier of information in an optical telecommunication system. The conventional PMD measurements are done on dark fiber. Otherwise, a service interruption would be necessary if the tunable laser for PMD measurements were introduced into a working channel.

It is preferable to measure the PMD in an active or working channel, rather than in a dark fiber, to accurately characterize the performance of an optical telecommunication system at a given time and frequency. Methods to measure PMD in working high-speed systems have been proposed, therefore, which use the optical spectrum of the transmitter modulated signal as a probe, and apply an optical frequency filter at the output of the fiber or active channel to characterize the PMD. Conventional 10 Gb/s systems currently in use, however, are characterized by a relatively narrow modulation spectrum. Measuring the PMD with adequate optical frequency resolution using conventional means is consequently difficult, and generally limited by the resolution of available optical frequency filters.

A method and apparatus are needed, therefore, for quickly and accurately measuring the PMD in an active fiber optic channel without interruption of service.

SUMMARY OF THE INVENTION

The present invention, which addresses the needs unmet by conventional methods, relates to a method and apparatus for quickly and accurately measuring a set of frequency-resolved states of polarization.

An apparatus for measuring a set of frequency-resolved states of polarization of an optical signal includes a local oscillator followed by a polarization scrambler for polarization-modulating an initial state of polarization of the local oscillator to produce a polarization-scrambled signal. The apparatus further includes a coupler for mixing the polarization-scrambled signal with at least a fraction of the optical signal to produce a heterodyned signal. The heterodyned signal includes a radio frequency signal component. The apparatus further includes an analyzer for passing a fixed polarization component of the at least the fraction of the optical signal and resolving the fixed polarization component in frequency from the radio frequency signal component.

In another embodiment, the apparatus includes a local oscillator followed by a polarization scrambler for modulating an initial state of polarization of the local oscillator to produce a polarization-scrambled signal. The apparatus further includes a polarization controller. The polarization controller is set to sequentially produce at least two input polarization states of at least a fraction of an optical signal through an optical device. The apparatus also includes a coupler for mixing the polarization-scrambled signal with the fraction of the optical signal at an output of the optical device to produce a heterodyned signal. The heterodyned signal includes a radio frequency signal component. The apparatus further includes an analyzer for passing a fixed polarization component of the at least the fraction of the optical signal and resolving the fixed polarization component in frequency from the radio frequency signal component. A set of frequency-resolved states of polarization is generated for each of the at least two input polarization states. The apparatus further includes a processor for calculating a polarization mode dispersion of the optical device from the at least two sets of frequency-resolved states of polarizations.

In a preferred embodiment, the optical device is a working optical channel of an optical telecommunication system, and the polarization mode dispersion of the fiber link is measured from the at least two sets of frequency-resolved states of polarizations.

A method of the present invention for measuring a set of frequency-resolved states of polarization of an optical signal includes the steps of tuning a local oscillator to a first local oscillator frequency to generate a first local oscillator signal and polarization-modulating an initial state of polarization of the local oscillator signal to generate a polarization-scrambled signal. The method further includes the steps of mixing the polarization-scrambled signal with at least a fraction of the optical signal to produce a heterodyned signal. The heterodyned signal includes a radio frequency signal component centered at a first beat frequency. The first beat frequency is equal to a difference between the first local oscillator frequency and a carrier frequency of the optical signal.

The method further includes the steps of analyzing frequency and polarization components of the radio frequency signal component, and generating a first set of frequency-resolved states of polarization from the frequency and polarization components of the heterodyned signal. The step of analyzing may include passing a fixed polarization component of the heterodyned signal through an adjustable polarization analyzer set to a fixed position, converting the fixed polarization component of the heterodyned signal to an electrical signal, and resolving the frequency components of the fixed polarization component.

The step of converting the heterodyned signal to an electrical signal may include detecting the heterodyned signal with a fast photodetector.

A method for measuring a polarization mode dispersion of an optical device includes the steps of: (a) tuning a local oscillator to a local oscillator frequency to generate a local oscillator signal; and (b) polarization-modulating an initial state of polarization of the local oscillator signal to generate a polarization-scrambled signal. The method further includes the steps of: (c) passing at least a fraction of the optical signal through a polarization controller positioned to produce one of at least two input polarization states; and then (d) transmitting the optical signal through the optical device. The method further includes (e) mixing the polarization-scrambled signal with the at least the fraction of the optical signal to produce a heterodyned signal. The heterodyned signal includes a radio frequency signal component centered at a beat frequency. The beat frequency is equal to a difference between the first local oscillator frequency and a carrier frequency of the optical signal.

The method further includes the steps of: (f) analyzing frequency and polarization components of the radio frequency signal component; and (g) generating a set of frequency-resolved states of polarization from the frequency and polarization components corresponding to the one of the at least two input polarization states. The method further includes step (h): repeating steps (a) through (g) for each of the at least two input polarization states to generate at least two sets of frequency-resolved states of polarization. The method also includes (i) calculating the polarization mode dispersion of the optical device from the at least two sets of frequency-resolved measurements of the states of polarization.

In a preferred embodiment, the optical device is a working channel of an optical telecommunication system. In this case, the method further comprises the step of tapping the at least the fraction of the optical signal from the working channel for mixing with the polarization-scrambled signal.

Preferably, the at least two input polarization states may be provided alternatingly in time by the polarization controller.

Additionally, the PMD of the working optical channel may be used to determine a correction factor for feedback to a compensation system.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION

The "states of polarization" may be any set of vectors and corresponding vector coefficients which can be used to completely characterize the polarization state of an optical wave or signal. As is well-known to those skilled in the art, the states of polarization are characterized by the three-component Stokes vector derived from the four Stokes parameters. (One of the four Stokes parameters represents the total intensity in the optical wave under test, and is used to normalize the three coefficients.) Also well-known to those skilled in the art, the Stokes vectors are the unit vectors on the so-called "Poincaré sphere" used to describe the polarization of an optical wave or signal.

In optical telecommunication networks, multiple working optical channels are typically carried on a single optical fiber. The single optical fiber is included in an optical fiber link, which includes the optical fiber and optical amplifiers and any other optical components between two connecting points or nodes along an optical transmission line. Each working channel may, for example, operate at a different wavelength in the optical fiber.

Figure 1:
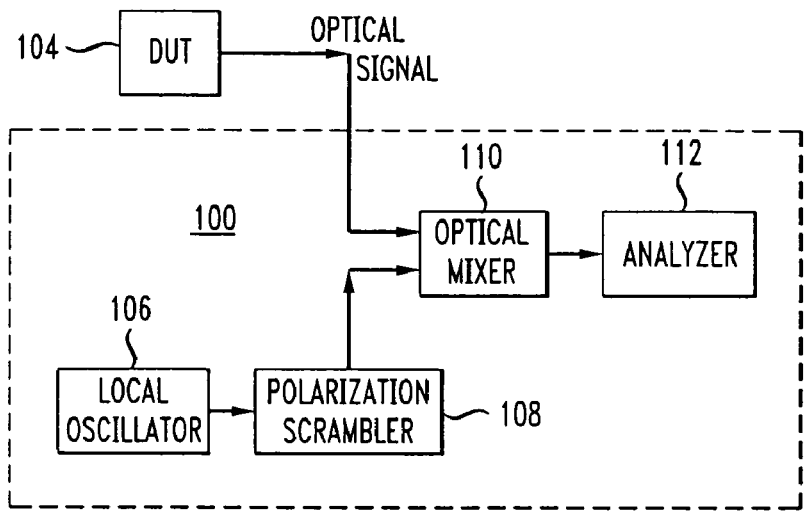
FIG. 1 is a block diagram of an embodiment of an apparatus formed in accordance with the present invention.

FIG. 1 shows a block diagram of an apparatus 100 formed according to embodiments of the present invention. The apparatus 100 measures frequency-resolved states of polarization in a radio frequency (RF) domain. In this embodiment, the apparatus 100 may be used as a high-resolution broadband polarimeter device. Additionally, the apparatus 100 may be used as a stand-alone device for laboratory measurements and simulations to measure frequency-resolved states of polarization.

In one embodiment of the device shown in FIG. 1, a polarizer or polarization controller may be added after an optical source and before a device under test (DUT) 104. The polarizer or controller can then be used to control the input polarization state to the DUT 104. By acquiring measurements of frequency-resolved states of polarization at an output of the DUT 104 corresponding to two or more different input polarizations, a polarization mode dispersion (PMD) of the DUT 104 may be measured.

The apparatus 100 preferably accepts an optical signal from the device under test 104. The apparatus 100 includes a local oscillator 106 coupled to a polarization scrambler 108. The polarization scrambler 108 is further coupled to an input of an optical mixer 110. A second input of the optical mixer 110 receives the optical signal to be analyzed. An output of the optical mixer 110 is coupled to an analyzer 112 operating in the RF domain, which produces a set of frequency-resolved states of polarization.

In operation, the local oscillator 106 injects a signal characterized by an initial polarization state into a polarization scrambler 108. The initial polarization state is modulated by the polarization scrambler 108 to produce a polarization-scrambled signal. The polarization-scrambled signal is mixed with the optical signal from the device under test 104 via the optical mixer 110. The local oscillator 106 is preferably tunable, so that the mixer generates a frequency-resolvable heterodyned signal in the RF domain, which is centered at a frequency equal to the difference between the optical signal carrier frequency and the local oscillator 106 frequency. This difference in frequency is commonly referred to as a beat frequency. An output polarization state of the heterodyned frequency is then analyzed in the RF domain using the frequency-resolving polarization analyzer 112.

The device under test (DUT) 104 can be any optical device, optical element, or optical material, which passes an optical signal for which a measurement of polarization is desired. In one embodiment, the DUT 104 is a fiber optic cable illuminated with a light source, which may be data-modulated, and the optical signal may be the light after transmission through the fiber optic cable. In one embodiment, the optical signal analyzed by the apparatus 100 formed in accordance with the present invention may be a wavelength-selected portion of the light transmitted through the fiber optic cable.

In a preferred embodiment, the device under test 104 is a fiber link in a working channel of a telecommunications system, and the light source is data-modulated (see FIG. 2).

The local oscillator (LO) 106 is preferably a tunable continuous wave (CW) laser. The oscillator 106 may, however, include any source that can generate a frequency-resolvable heterodyned signal when mixed with the optical signal. Most preferably, the LO 106 is tuned to a frequency that yields a beat frequency equal to double the bandwidth B of the optical signal, so that the beat frequency signal will not overlap with a baseband signal centered around zero.

The polarization scrambler 108 is any device capable of modulating the initial polarization state of the LO 106 so that all states of polarization are generated, preferably on a time scale shorter than the dwell time of the RF-resolved measurement. As is well-known to those skilled in the art, this complete polarization scrambling is typically referred to as "completely covering a Poincaré sphere", where the states of polarization (SOP) sweep over the surface of the Poincaré sphere. In one embodiment, a commercial 4 MHz polarization scrambler is preferably used.

The optical mixer 110 includes any device in which the local oscillator signal and the optical signal can be beat together to produce a heterodyned signal that can be analyzed in the radio frequency domain. Preferably, the optical mixer 110 includes an optical coupler, most preferably a 3-dB optical coupler, or a beam-splitter.

The analyzer 112 includes any device or instrument capable of analyzing the polarization components and frequency components of the heterodyned signal. As such, the analyzer 112 includes a polarization analyzer and a frequency analyzer, which may be encompassed in one device, or may include two separate devices.

Preferably, the analyzer includes a polarization analyzer followed by a fast photodetector (PD) to convert the heterodyned signal into an electrical signal. The electric signal is then analyzed in the RF domain by the frequency analyzer, preferably an RF spectrum analyzer (RFSA). Most preferably, a dwell time of the RFSA is longer than the time needed to cover the Poincaré sphere.

The range of the RFSA is preferably large enough to cover the frequency-sampled beat frequency or RF heterodyned signal. Preferably, the range is at least 3B/2, where B is the bandwidth of the optical signal. The set of frequency-resolved states of polarization that can be measured according to embodiments of the present invention may be limited in the upper end by either the frequency-range of the RFSA or the frequency bandwidth of the fast photodetector, whichever is lower. The measurements may be limited on the lower frequency end by the ability to tune the local oscillator 106 to at least twice the bandwidth of the input signal, and thus avoid overlap of the baseband signal with the heterodyned signal centered at the beat frequency.

In an alternate embodiment, several consecutive heterodyned measurements may be made, each centered at a shifted local oscillator (LO) frequency, and each representing a so-called "polarization string" on a Poincaré sphere. To extend the range of frequency over which polarization measurements can be made, the LO is preferably sequentially tuned to adjacent equally-spaced central frequencies to completely cover the frequency range of interest. Several sets of preferably overlapping heterodyned measurements, shifted in frequency, form a complete set of frequency-resolved SOP measurements.

In yet another embodiment, the electrical signal is analyzed using either a set of RF bandpass filters or an RF arrayed waveguide grating. Preferably, ten to fifteen sequential frequency measurements are obtained using the RF filters. Preferably, a range of about 15 GHz is sampled, so that measurements are taken corresponding to a frequency sampling of about 1 to about 1.5 GHz.

The polarization analyzer, which is part of the analyzer 112, may be any device, instrument, or set of devices capable of analyzing the output polarization state of the RF component of the heterodyned signal. The polarization analyzer further preferably includes any device capable of measuring polarization components of an incident optical field or signal, where the measured polarization components can be used to generate the states of polarization of the optical field.

A typical polarization analyzer well-known to those skilled in the art includes at least a polarizer and a ¼-wave plate, also called a ¼-wave retarder. The analyzer is capable of passing a fixed polarization component of the incident optical signal by rotating the polarizer and the ¼-wave plate to a fixed position. Though the present invention is described in terms of the typical polarization analyzer described herein, the device of the present invention is by no means limited to any particular polarization analyzer.

The polarization analyzer of the device of the present invention preferably comprises at least three fixed positions. Each fixed position is set to pass a fixed polarization component of the optical signal. The intensity transmitted by the analyzer at the fixed position is detected and recorded by the fast photodetector. As is well-known to those skilled in the art, the Stokes parameters may be generated from a measurement of total intensity and three measurements of the transmitted intensity corresponding to each of three measured polarization components of the optical signal: e.g., linear horizontal or vertical polarization (θ=0° or 90°), linear 45° or 135° polarization θ=45° or 135°) and right (or left) circular polarization.

By recording the RF spectra of the measured intensity at the fast photodetector corresponding to each fixed polarization component, a set of frequency-resolved fixed polarization components is generated, from which the set of frequency-resolved states of polarization (i.e., Stokes vectors and coefficients) is preferably measured.

Figure 2A:
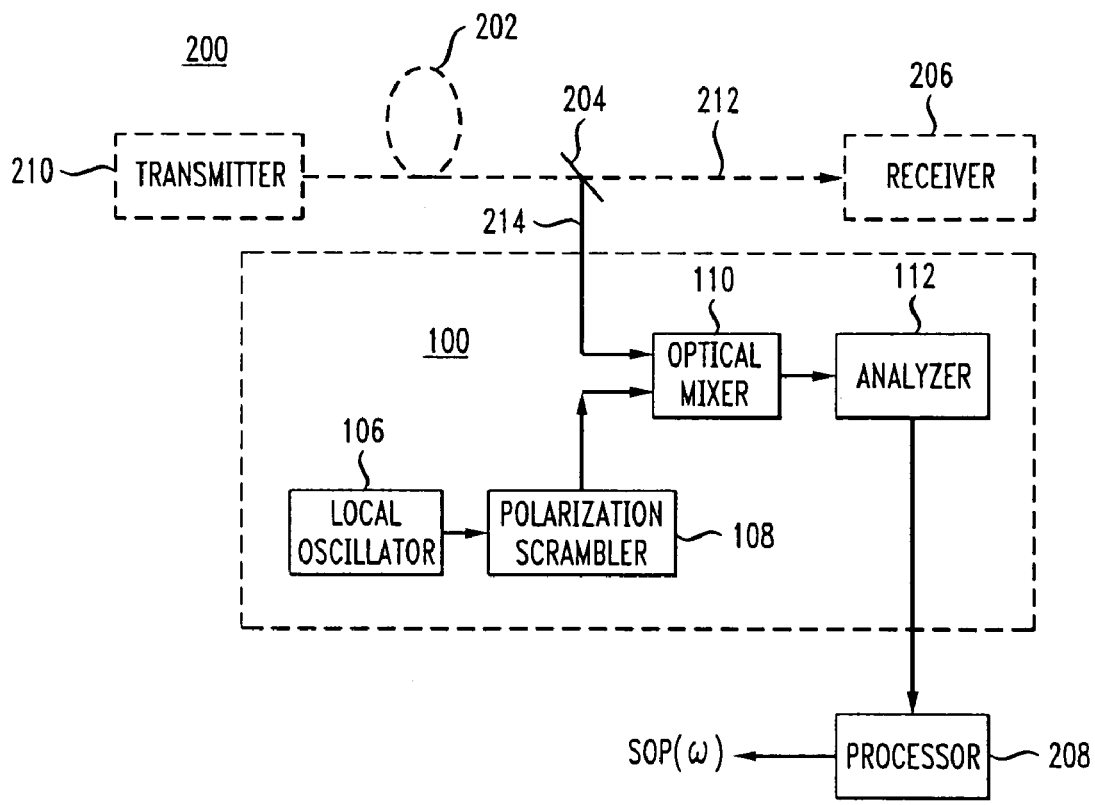
FIG. 2*a* is a block diagram of the apparatus of FIG. 1 incorporated into a telecommunication system.

In an alternate embodiment 200 of the present invention shown in FIG. 2a, the device under test 104 includes a working channel 202 of an optical telecommunication system. This embodiment includes apparatus 100, which is used to measure a set of frequency-resolved states of polarization corresponding to the optical signal in the working channel. The apparatus 200 is preferably applied to measure a polarization mode dispersion (PMD) in-situ in the working channel 202 of the optical telecommunication system (see FIG. 2b).

The apparatus of this embodiment 200 preferably includes an optical out-coupler 204 positioned before a receiver 206 in the system. The out-coupler 204 may be any device capable of tapping a fraction of an optical signal at the output of the optical channel under test 202. The out-coupler 204 may include any combination of an optical grating, an etalon, a beamsplitter, and a fiber optic coupler. The apparatus 200 may further include a processor 208 to calculate and data storage to store the SOP as a function of optical frequency ω, SOP(ω), also referred to herein simply as SOP.

In FIG. 2a, the optical signal is a data-modulated optical signal 212 that is launched by a transmitter 210 into a working channel 202 of a telecommunication system. A small fraction 214 of the transmitted optical signal 212 is tapped off using the optical out-coupler 204 and fed into an input of the optical mixer 110. The set of frequency-resolved polarization components measured by the analyzer 112 are used to obtain a measurement of the set of frequency-resolved output states of polarization (SOP) of the working channel or active fiber 202.

Figure 2B:
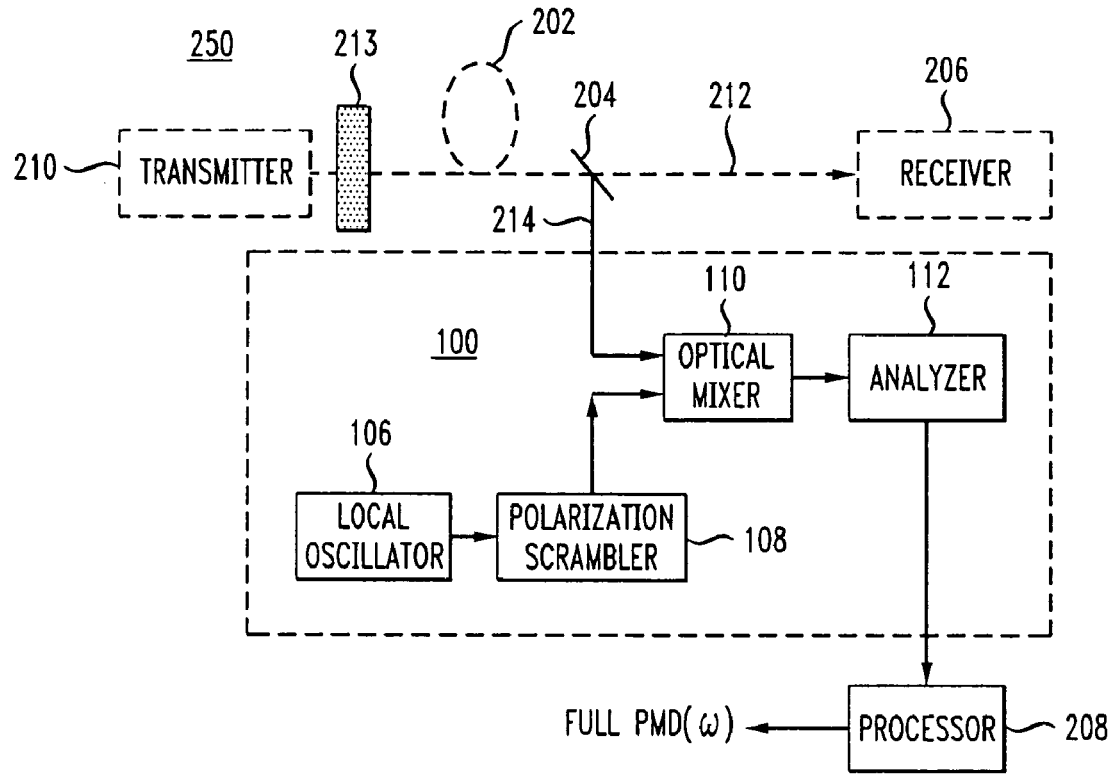
FIG. 2*b* is a block diagram of an apparatus formed in accordance with the present invention incorporated into a telecommunication system for polarization mode dispersion (PMD) monitoring of a working optical channel.

Referring to FIG. 2b, in another embodiment, the device 250 formed in accordance with the present invention includes a polarization controller 213. The polarization controller 213 is preferably located downstream of a multiplexer (not shown) in the optical communication system. At least a fraction of the optical signal from the transmitter passes through the polarization controller 213. The polarization controller 213 alternates between at least two positions in order to sequentially produce at least two input polarization states, thus launching at least two input polarization states into the working channel 202 at different times. Preferably, the controller 213 alternates between at least three positions to sequentially launch at least three input polarization states, for improved accuracy in measurements. For each input polarization state, separated in time, a set of frequency-resolved SOP are obtained as described above: a fraction 214 of the transmitted optical signal 212 is tapped and fed into the optical mixer 110, the frequency-resolved polarization components are measured using the analyzer 112 and the frequency-resolved SOP are calculated therefrom.

As is well-known to those skilled in the art, calculations of the PMD as a function of frequency can then be obtained from the at least two sets of frequency-resolved SOP corresponding to the at least two input polarization states.

Calculations of the full PMD as a function of frequency ω may be performed by the processor 208 by applying any method known in the art to calculate PMD from the frequency-resolved SOPs corresponding to at least two input polarization states. These measurements may be used for monitoring a status of operation of the working telecommunication system, to estimate service outage probabilities, and to prevent service interruption due to rising PMD effects.

The use of the polarization controller 213 to sequentially launch at least two input polarization states into the working channel 202, is described in M. Boroditsky, et al., "In-Service Measurements of Polarization-Mode Dispersion and Correlation to Bit-Error Rate", *IEEE Phot. Tech. Lett.*, Vol. 15, No. 4, pp. 572–574 (April 2003), the disclosure of which is incorporated herein by reference.

The transmitter 210 may be any device capable of transmitting data-modulated optical signals. The light source in transmitter 210 in most working telecommunication systems is a laser diode. The transmitted signal 212 is preferably coupled to multiple working optical communication channels. The fraction 214 of transmitted signal 212 is preferably a fraction extracted or tapped from a single working optical communication channel transmitted along a strand of fiber optic cable.

The transmitted signal in each optical channel is typically modulated to carry information. In conventional systems, for example, in OC-192 systems, the rate of modulation is about 10 Gb/sec. With this relatively narrow modulation spectrum, the optical filtering required to characterize the frequency-resolved states at the output of the fiber or active channel to characterize the PMD is difficult. In conventional apparatus, the measurement resolution is typically limited by the bandwidth of optical frequency filters, typically greater than 30 GHz.

To avoid this limitation in the optical domain, the method and apparatus according to the present invention advantageously apply heterodyning to translate the measurements of polarization mode dispersion into the RF domain. In contrast to the optical regime, the resolution of RF filters and spectrum analyzers is on the order of MHz, and operating ranges of RFSA's typically extend over 20 GHz. This range is adequate to cover the frequency range required to scan a typical data-modulated optical signal corresponding to a bandwidth of about 7 GHz, centered around a preferred beat frequency of about 15 GHz. The preferred beat frequency is slightly more than twice the bandwidth of the data-modulated optical signal. The method of the present invention allows a quick measurement of a string of states of polarization (SOP), that is, a set of frequency-resolved SOP of an output signal, to quickly and accurately characterize the depolarization effects that occur during transmission of the optical signal over a working channel.

A well known problem with heterodyne measurements is that due to the vector nature of the electric field, an RF component at the beat frequency $(\omega_s-\omega_{LO})$ of a heterodyned signal depends on the mutual orientation of the signal field $\vec{E}_S$ and the local oscillator (LO) field $\vec{E}_{LO}$, according to the following equation for the total intensity of the mixed signal:

$$I_{tot} = |(\vec{E}_S e^{j\omega_s t} + \vec{E}_{LO} e^{j\omega_{LO} t})|^2 \vec{E}_S^2 + 2\vec{E}_S \cdot \vec{E}_{LO} \cos[(\omega_S-\omega_{LO})t] + \vec{E}_{LO}^2, \quad (1)$$

where $\omega_s$ and $\omega_{LO}$ represent optical signal frequency and LO frequency, respectively, and t represents time.

The $\vec{E}_S \cdot \vec{E}_{LO}$ term in equation (1) is the signal component of interest, representing the frequency resolved measurements of the SOP being analyzed. This $\vec{E}_S \cdot \vec{E}_{LO}$ term is referred to herein as the beat frequency signal component or the radio frequency signal component of the heterodyned signal represented by equation (1). To optimize the signal in a conventional arrangement, the relative orientation of polarizations $\vec{E}_S \cdot \vec{E}_{LO}$ is preferably adjusted to maximize the beat frequency signal component for every optical frequency. In accordance with the present invention, this major inconvenience is avoided by employing fast polarization scrambling of the LO signal. As long as the dwell time of the RF analyzer is longer than the time needed to cover the Poincaré sphere, the scrambling of the LO signal eliminates the polarization angle dependence of the measurement inherent in the $\vec{E}_S \cdot \vec{E}_{LO}$ term, at the cost of a two-fold reduction in signal strength relative to a perfectly aligned polarization.

In addition, if the polarization of the local oscillator varies rapidly, the average RF power detected at beat frequency $|\omega_s - \omega_{LO}|$ after the polarization analyzer with a state of polarization represented by |x>, will be proportional to the squares of both electric fields $\vec{E}_S$ and $\vec{E}_{LO}$ and to the signal's polarization component parallel to the analyzer axis $|>x|s(\omega)>|^2$, where $|s(\omega)>$ is the state of polarization of the signal's spectral component of interest. Therefore, the apparatus according to embodiments of the present invention preferably functions as a high-resolution broadband polarimeter.

In a method of the present invention, data from an SOP string measured by apparatus 250, shown in FIG. 2b, are used for PMD measurement of an operating channel. Such data may also be used to directly monitor the impact of the PMD on the system performance, for example, by incorporating the apparatus 250 in accordance with FIG. 2b at several points along a fiber route. The fiber route is defined as the total active fiber or channel between two terminating points in an optical transmission of data. Additionally, the apparatus and method formed in accordance with the present invention may be used to provide a feedback signal, as shown in FIG. 3.

Figure 3:
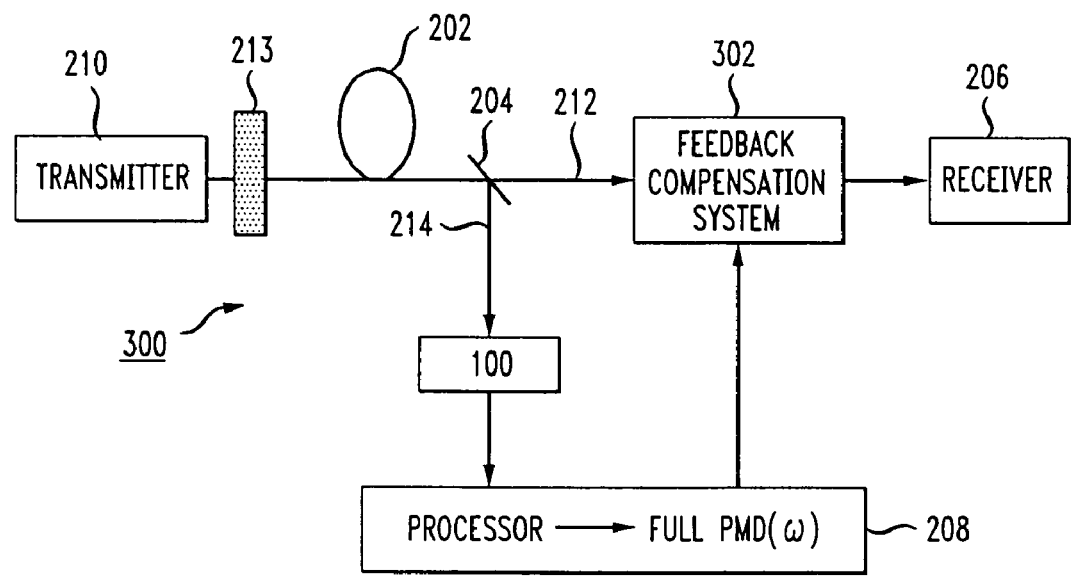
FIG. 3 is a block diagram of the apparatus of FIG. 2*b* incorporated into a telecommunication system for PMD compensation.

FIG. 3 shows an optical telecommunication system 300 formed in accordance with the present invention. This embodiment includes a feedback system 302 for active PMD mitigation or compensation. In operation, the transmitter 210 in a working telecommunication system launches at least two input polarization states of the data-modulated optical signal 212 into an active channel 202 of the system 300, preferably by alternating the input polarization state in time, using polarization controller 213. The small fraction 214 of the transmitted optical signal 212 is tapped off using the optical out-coupler 204 and fed into the apparatus 100, shown in FIG. 1. A set of frequency-resolved states of polarization is derived from apparatus 100 for each input polarization state, resolving the data in time by means well-known to those skilled in the art. The at least two sets of frequency-resolved SOPs are preferably used by the processor 208 to compile the full PMD of the active fiber 202 as a function of frequency $\omega$. These calculations of the full PMD are used as feedback to a compensation system 302 and used to correct the effects of PMD by modifying the transmitted data-modulated optical signal 212 before it is passed on to the receiver 206 in the working telecommunication system 300.

The compensation system 302 may be any conventional compensation system known in the art.

Calculations of the full PMD in accordance with FIG. 2b and FIG. 3, preferably by the processor 208, are performed from the measured Stokes parameters obtained for at least two input polarization states. Though the present invention is discussed in terms of measuring Stokes parameters, it is understood that the method and apparatus of the present invention, which include heterodyning a polarization-scrambled LO signal with an optical signal to be analyzed, may be used to measure any set of polarization components and set of polarization vectors as a function of frequency.

The PMD is fully characterized by a vector quantity $\vec{\tau}(\omega)$ where the differential group delay (DGD) is the magnitude of the vector $|\vec{\tau}(\omega)|$. As indicated by the notation, the PMD and DGD are a function of optical frequency $\omega$. Any input polarization state can be resolved into directional components along two orthogonal principal states of polarization (PSP). The DGD then represents the separation in time between the PSP's after traversing a length of fiber. For each optical frequency or wavelength propagating in a fiber, two PSP's exist, such that the pulse spreading due to PMD vanishes if only one PSP is excited. The PMD of a fiber is typically characterized in terms of mean DGD between the PSP corresponding to different frequencies, and is independent to a first order of wavelength, temperature, and external perturbations.

In order to derive the full PMD as a function of frequency, frequency-resolved measurements of at least two preferably independent input polarization states are performed on the optical signal of interest. According to the present invention, measurement of the Stokes parameters are preferably performed to characterize the output SOP from the measured frequency-resolved polarization components passed by the polarization analyzer as described herein. The polarization components preferably correspond to a horizontal linear polarization, a 45-degree linear polarization, and a circular polarization.

Several techniques may be used for converting sets of SOP's, most commonly Stokes parameters, to PMD measurements. Techniques differ in which input polarization states are used and in how the measured sets of SOP are manipulated. The result, however, is the same: a measurement of the PMD vector, that is, both the DGD and PSP as a function of the frequency analyzed. The so-called Poincaré Sphere Analysis (PSA) and Jones Matrix Eigenanalysis (JME) techniques are described in detail, for example, in Normand Cyr, Andre Girard, and Gregory W. Schinn, "Stokes Parameter Analysis Method, the Consolidated Test Method for PMD Measurements", *NFOEC '99 Convention* (Chicago, Ill. 1999), which is incorporated herein by reference.

The PSA and JME methods require the same test procedures. Both find the PSP and the DGD as a function of frequency from raw polarimetric data. The polarimetric data is converted to normalized Stokes vectors at the output of a fiber, as a function of optical frequency, for a particular input polarization state. The normalized Stokes vectors can be plotted as a position on a Poincaré sphere. Both methods measure the local "angular velocity", in which time is actually optical frequency, of the frequency-resolved SOP from a measurement of the position of the Stokes vectors on the sphere at two neighboring optical frequencies. PSA is performed directly in "Stokes space", i.e., PSA operates directly on the Stokes parameter representation of the SOP.

JME is performed in the Jones vector representation after the Stokes vectors have been transformed into normalized Jones vectors.

A so-called Müller Matrix Method (MMM) technique is a combination of the PSA and JME methods. The MMM method is described in detail in R. M. Jopson, L. E. Nelson, and H. Kogelnik, "Measurement of Second-Order Polarization-Mode Dispersion Vectors in Optical Fibers", *IEEE Phot. Tech. Lett.,* Vol. 11, No. 9, pp. 1153–55 (September 1999). Like PSA and JME, MMM requires the determination of output Stokes vectors at each frequency ω corresponding to two input polarization states. Unlike PSA however, MMM has the ability to determine the rotation matrix of a fiber, while also staying entirely within Stokes vector space. The MMM technique is advantageously independent of the relative angle between the two input linear polarizations.

These techniques are merely offered as examples of methods used to derive the PMD and are not intended to limit the scope of the present invention. Any method known in the art may be used in conjunction with the method and apparatus of the present invention to convert the set of frequency-resolved states of polarization to a full PMD as a function of frequency.

Figure 4:
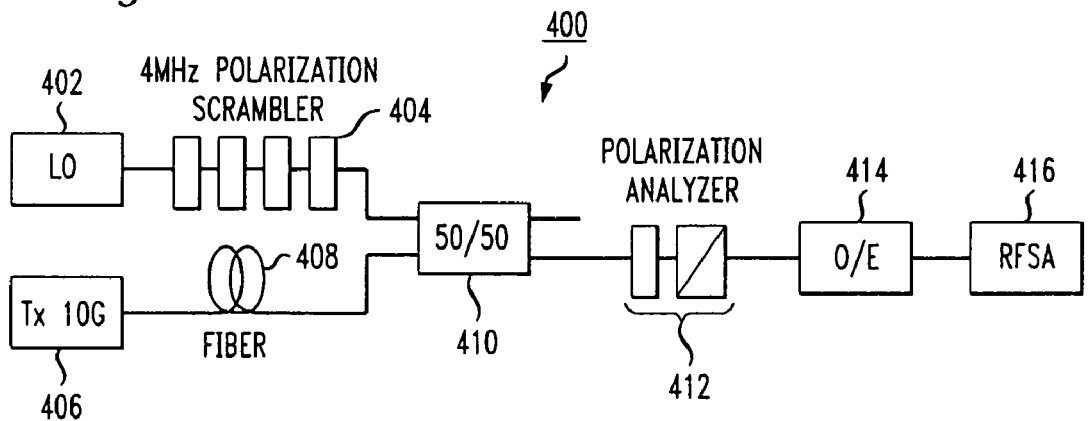
FIG. 4 is a block diagram of an experimental test setup according to the method and apparatus of the present invention.

FIG. 4 shows a preferred embodiment of a measurement apparatus 400 formed in accordance with the present invention used to measure the frequency-resolved SOP of a typical optical data transmission signal after passing through a fiber under test. The local oscillator (LO) 402 of this preferred embodiment is preferably a tunable continuous wave (CW) laser, followed preferably by a 4 MHz polarization scrambler 404. The 4 MHz polarization scrambler 404 is available from Fiber Control Corporation, Holmdel, N.J. 07733 as part number PS-700. The transmitter 406 preferably injects a 10 Gb/s data-modulated transmission signal into a test fiber 408. A 3-dB coupler 410 is used to mix the LO signal with the optical signal output from the test fiber 408.

The apparatus 400 may be used to measure a set of frequency-resolved SOP of an optical fiber or any optic or optical device on a laboratory bench. The apparatus 400 may also be used to measure the PMD of any optic or optical device by inserting a polarizer (not shown) after the transmitter 406. Two sets of data are then obtained for two preferably significantly different input polarizations. When used to dynamically monitor a working channel in-situ in an optical telecommunication system, a fraction of the transmission signal is preferably extracted or tapped off before the receiver and input to the coupler, as shown in FIG. 2a.

The optical device that may be tested includes any device or element that transmits or generates optical radiation. In a preferred embodiment, the optical device is an optical fiber or a working optical channel of a fiber.

The analyzer of this preferred embodiment 400 includes a polarization analyzer 412, fast photodetector 414, and an RF spectrum analyzer (RFSA) 416. The polarization analyzer 412 preferably includes at least an adjustable polarizer and a quarter-wave plate. The scan or dwell time of the RFSA 416 is preferably longer than the time needed for the polarization scrambler 404 to cover the Poincaré sphere.

A single "string" measurement preferably consists of first tuning the LO 402 to a central frequency, and taking three RFSA traces for three fixed positions of the polarization analyzer 412 corresponding to three fixed polarization components of the incident signal. The data is processed to obtain the Stokes vectors which are plotted as traces on the surface of a Poincaré sphere. The LO 402 is preferably tuned to about 15 GHz away from the carrier frequency (slightly over twice the approximate 7 GHz bandwidth of the 10 Gb/s modulated transmission signal), so that a beat frequency signal component centered at about 15 GHz is generated in the optical coupler 410. Each of three positions of the polarizer and quarter-wave plate preferably corresponds to one of the horizontal and vertical linear polarization, one of the 45-degree linear and 135-degree linear polarization, and one of a left-circular and right-circular polarization. A preferably fast photodetector 414 placed after the polarization analyzer 412 converts the optical signal to an electrical signal, so that the beat frequency signal component of interest can be analyzed with a frequency analyzer, preferably a RFSA.

For each fixed polarization component, a RFSA trace is preferably generated, which covers the entire frequency-range of the beat frequency signal component of the heterodyned signal. The frequency-resolved optical power corresponding to each fixed polarization component is recorded in the RF spectra of the trace. Thus, three traces are generated: one for each of the three measured polarization components. From these measurements, the Stokes parameters are preferably calculated as a function of frequency and the results are normalized to the unit Poincaré sphere. These results are preferably processed using a processor as shown, for example, in FIG. 2b.

Figure 5:
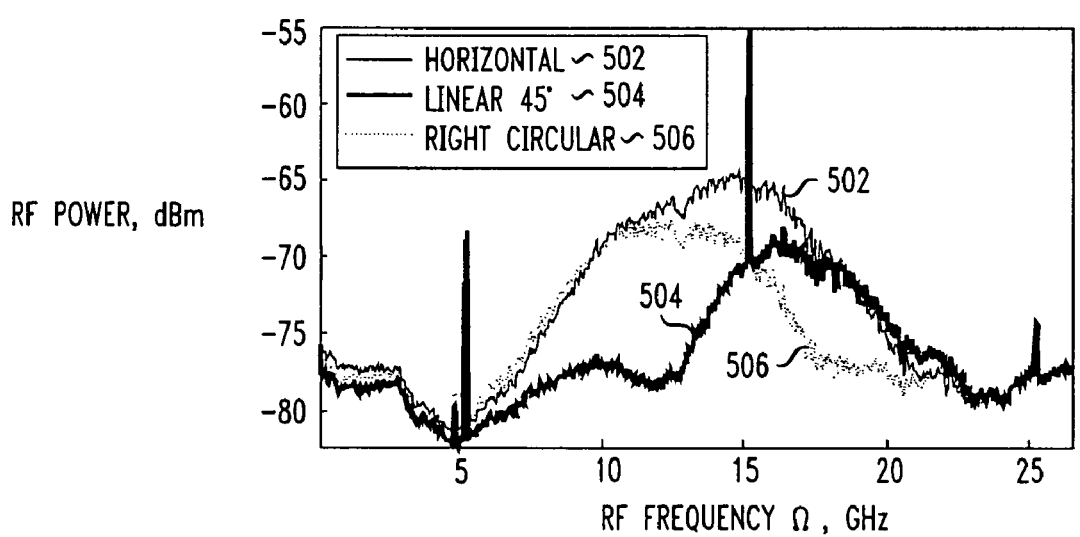
FIG. 5 is a plot of radio frequency spectra obtained with the experimental test setup of FIG. 4.

Typical traces from the RFSA derived from the apparatus shown in FIG. 4 are plotted in FIG. 5. The measurements generating these traces were performed with the apparatus of FIG. 4 using an externally modulated non-return-to-zero (NRZ) signal at 10 Gb/s. The traces were generated for the following three polarization orientations: horizontal 502, linear 45-degree 504, and right circular 506. The relative strength of a baseband signal was suppressed by boosting the power of the local oscillator relative to the modulated signal (see equation (1)). As expected, the measurement accuracy in the low frequency range is limited in this example by overlap with the baseband signal centered around zero frequency. In the high frequency end of each trace, the accuracy is limited in this example by the frequency response of the instrumentation, in this case, the operating range of the RFSA and photodetector. Even within these limitations, a set of frequency-resolved measurements centered at about 15 GHz covers a range of at least 10 GHz.

Several heterodyned measurements centered at adjacent carrier frequencies may preferably be used, therefore, to fully characterize the PMD as a function of frequency.

Figure 6:
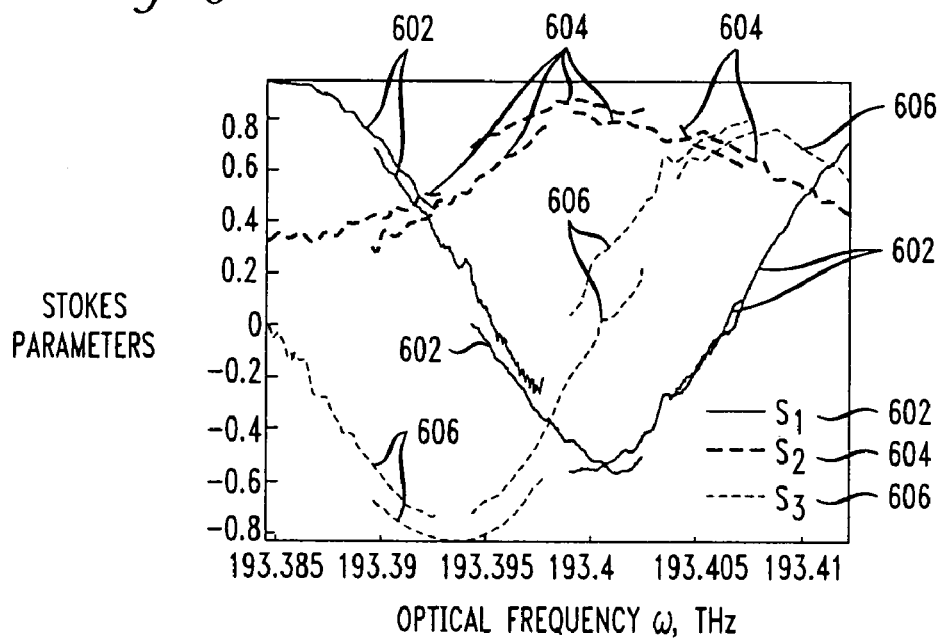
FIG. 6 is a plot of three Stokes parameters extracted from the experimental data plotted in FIG. 5.

FIG. 6 is a plot of the Stokes parameters measured for several adjacent carrier frequencies $\omega_s$ derived from the measured polarization components plotted in FIG. 5 and plotted in the optical frequency domain. $S_1$ 602 corresponds to measurements of the horizontal linear SOP, $S_2$ 604 corresponds to measurements of the 45-degree linear SOP, and $S_3$ 606 corresponds to measurements of the right circular SOP. For each SOP, five heterodyned measurements were generated by sequentially tuning the LO frequency to five different frequencies spaced approximately 6 GHz apart, i.e., the CW laser was wavelength-scanned over a total of 0.2 nm (about 24 GHz) in the range of 1550–1550.2 nm. The measurements yielded overlapping RF spectra with the RF or beat frequency component of each heterodyned signal centered at the tuned LO central frequency. Each of the five heterodyned measurements represents a polarization string on a Poincaré sphere 700 (see FIG. 7a, e.g.). The slight lack of continuity between the strings is attributed to both polarization drift between the measurements and about 1 GHz drift in the frequency of the transmission laser.

Figure 7A:
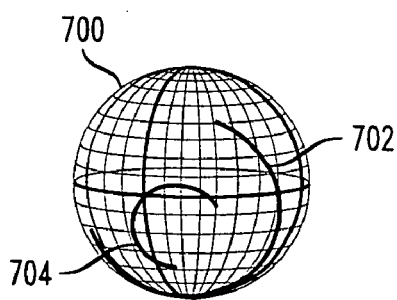
FIG. 7*a* is a plot on a Poincaré sphere derived from experimental data taken using conventional apparatus for measuring PMD of a fiber.

The operation of the apparatus and method formed in accordance with the present invention was verified by comparing measurements taken with the apparatus shown in FIG. 4 with those from a commercial instrument for a reference fiber. A section of a polarization maintaining (PM) fiber with known Differential Group Delay (DGD) of 25 picoseconds (ps) was used as the reference fiber. An output SOP was measured as a function of the optical frequency for two different input polarizations using conventional polarization analyzers. The frequency-dependence of the SOP measurements was obtained by radio-frequency spectral analyses, but could equivalently be obtained by optical filtering after the polarizer. As expected from PM fiber, this measurement resulted in two circular arcs on the Poincaré sphere 700, as shown in FIG. 7*a*. One arc 702 plots SOP evolution with frequency for an arbitrary input polarization state and the second 704 is a plot of SOP evolution with frequency for a different arbitrary input polarization state.

Figure 7B:
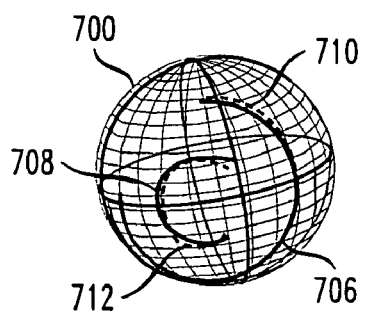
FIG. 7*b* is a plot on a Poincaré sphere derived from the experimental data plotted in FIG. 6, for the same fiber used to plot FIG. 7*a*.

FIG. 7*b* shows results from the same fiber and for the same output SOP's measured for the same two input polarization states as FIG. 7*a* using the embodiment 400 of the apparatus shown in FIG. 4. The data was obtained by combining five overlapping frequency regions, each covering about 10 GHz bandwidth and centered at 0.05 nm intervals: i.e., around 1550 nm, 1550.05 nm, 1550.10. nm, 1550.15 nm and 1550.20 nm. A fourth-order polynomial fit was used to smooth measurement noise on measured arcs (solid lines) corresponding to the first 706 and second input polarization state 708, and combine these into one continuous arc for the first 710 and second input polarization state 712. Apart from a shifted reference frame for the apparatus 400 of the present invention shown in FIG. 4, in comparison to the conventional polarimeter, the results of FIG. 7*b* and FIG. 7*a* are very close in terms of the shape and mutual orientation of the respective traces.

Figure 8A:
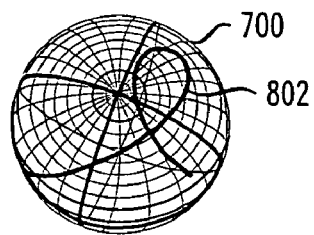
FIG. 8*a* is a plot on a Poincaré sphere derived from experimental data using conventional apparatus to measure the output state of polarization (SOP) from a high-PMD fiber.
Figure 8B:
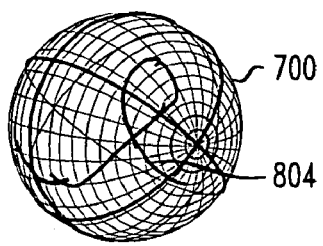
FIG. 8*b* is a plot on a Poincaré sphere of the output SOP measured with the test set-up of FIG. 4 for the same high-PMD fiber used to plot FIG. 8*a*.

The operation of the apparatus 400 and method formed in accordance with the present invention was tested using a high-PMD fiber with a known mean DGD of 30 ps in place of the fiber 408 in FIG. 4. As described above, one output SOP trajectory as a function of frequency for a given input polarization state was measured with a commercial polarimeter and a tunable laser over a 25 GHz frequency range. The resultant SOP measurements 802 are represented on the Poincaré sphere 700 as shown in FIG. 8*a*. FIG. 8*b* shows results 804 from the same fiber and for the same output SOPs measured using the preferred embodiment 400 of the apparatus formed in accordance with the present invention. The data was obtained by combining five overlapping frequency regions, each covering about 10 GHz bandwidth and centered at 0.05 nm intervals: i.e., around 1550 nm, 1550.05 nm, 1550.10 nm, 1550.15 nm and 1550.20 nm. A fourth-order polynomial fit was used to smooth over measurement noise. The traces shown in FIG. 8*b* are substantially similar to those shown in FIG. 8*a*, differing only in a rotation of the reference frame used in the measuring apparatus.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An apparatus for measuring a set of frequency-resolved states of polarization of an optical signal comprising:
    a local oscillator, the local oscillator comprising an initial polarization state;
    a polarization scrambler, the polarization scrambler modulating the initial polarization state of the local oscillator to generate a polarization-scrambled signal;
    a coupler, the coupler mixing the polarization-scrambled signal with at least a fraction of the optical signal to generate a heterodyned signal, the heterodyned signal comprising a radio frequency signal component; and
    an analyzer including a polarization analyzer, a photodetector and a frequency analyzer, the polarization analyzer passing a fixed polarization component of the at least the fraction of the optical signal, the photodetector detecting and converting a fixed output state of polarization of the radio frequency signal component to an electrical signal, the frequency analyzer sampling the radio frequency signal component of the electrical signal in frequency, the analyzer resolving the fixed polarization component in frequency from the radio frequency signal component.

2. The apparatus of claim 1, wherein the frequency analyzer comprises a radio frequency spectrum analyzer.

3. The apparatus of claim 2, wherein a dwell time of the radio frequency spectrum analyzer is longer than a time needed for the polarization scrambler to cover a Poincaré sphere.

4. The apparatus of claim 1, wherein the frequency analyzer comprises a set of radio frequency bandpass filters.

5. The apparatus of claim 1, wherein the local oscillator is tuned to yield a beat frequency, the beat frequency being equal to at least twice a bandwidth of the optical signal.

6. The apparatus of claim 1, further comprising an optical out-coupler, the optical out-coupler tapping the at least the fraction of the optical signal from a working optical channel of an optical telecommunication system.

7. The apparatus of claim 6, wherein the optical out-coupler comprises at least one of an optical grating, an etalon, a beamsplitter, and an optical coupler.

8. The apparatus of claim 1, further comprising:
    a polarization controller, the polarization controller set to sequentially produce at least two input polarization states of the at least the fraction of the optical signal through an optical device, wherein at least two sets of frequency-resolved states of polarization are measured at an output of the optical device, one for each of the at least two input polarization states; and
    a processor, the processor calculating a polarization mode dispersion of the optical device transmitting the optical signal from the at least two sets of frequency-resolved states of polarization of the optical signal.

9. The apparatus of claim 8, wherein the optical device is a working optical channel, the polarization mode dispersion of the working optical channel being calculated from the at least two sets of frequency-resolved states of polarization of the optical signal.

10. The apparatus of claim 9, further comprising a compensation system, wherein the processor further determines a compensation for feedback to the working optical channel, the compensation system receiving the compensation and modifying the optical signal to compensate for the polarization mode dispersion.

11. A method for measuring a set of frequency-resolved states of polarization of an optical signal comprising the steps of:
    tuning a local oscillator to a first local oscillator frequency to generate a first local oscillator signal;
    polarization-modulating an initial state of polarization of the first local oscillator signal to generate a polarization-scrambled signal;

mixing the polarization-scrambled signal with at least a fraction of the optical signal to produce a heterodyned signal, the heterodyned signal comprising a radio frequency signal component centered at a first beat frequency, the first beat frequency being equal to a difference between the first local oscillator frequency and a carrier frequency of the optical signal;

analyzing frequency components and polarization components of the radio frequency signal component, including passing a fixed polarization component of the heterodyned signal through an adjustable polarization analyzer set to a fixed position, converting the fixed polarization component of the heterodyned signal to an electrical signal and resolving the frequency components of the fixed polarization component; and generating a first set of frequency-resolved states of polarization from the frequency components and polarization components.

12. The method of claim 11, wherein the step of converting the heterodyned signal to an electrical signal includes detecting the heterodyned signal with a fast photodetector.

13. The method of claim 11, wherein the adjustable polarization analyzer comprises at least three fixed positions, and further wherein the steps of passing, converting and resolving are performed at least three times, once for each of the at least three fixed positions to generate frequency-resolved measurements of at least three fixed polarization components.

14. The method of claim 13, wherein the at least three fixed polarization components comprise one of a horizontal and vertical linear polarization state, one of a 45-degree and a 135-degree linear polarization state, and a circular polarization state to generate at least three frequency-resolved measurements of the at least three fixed polarization components.

15. The method of claim 14, wherein the step of generating the first set of frequency-resolved states of polarization comprises calculating a set of frequency-resolved Stokes parameters from the at least three frequency-resolved measurements of the at least three fixed polarization components.

16. The method of claim 11, further comprising the steps of:

tuning the local oscillator to a second local oscillator frequency to generate a second local oscillator signal;

polarization-modulating a second initial state of polarization of the second local oscillator signal to generate a second polarization-scrambled signal;

mixing the second polarization-scrambled signal with at least the fraction of the optical signal to produce a second heterodyned signal, the second heterodyned signal comprising a second radio frequency signal component centered at a second beat frequency, the second beat frequency being equal to a difference between the second local oscillator frequency and the carrier frequency of the optical signal;

analyzing a second set of frequency components and polarization components of the second radio frequency signal component; and generating a second set of frequency-resolved states of polarization from the second set of frequency components and polarization components.

17. The method of claim 16, further comprising the steps of:

combining the first set of frequency-resolved states of polarization with the second set of frequency-resolved states of polarization to form a combined set; and smoothing a noise component in the combined set.

18. The method of claim 11, wherein the optical signal is from a working channel of an optical telecommunication system, the method further comprising the step of tapping the at least the fraction of the optical signal from the working channel for mixing with the polarization-scrambled signal.

19. A method for measuring a polarization mode dispersion of an optical device, comprising the steps of:

(a) tuning a local oscillator to a local oscillator frequency to generate a local oscillator signal;

(b) polarization-modulating an initial state of polarization of the local oscillator signal to generate a polarization-scrambled signal;

(c) passing at least a fraction of an optical signal through a polarization controller, the polarization controller set to produce one of at least two input polarization states;

(d) transmitting the optical signal through the optical device, after the step of passing the at least the fraction of the optical signal through the polarization controller;

(e) mixing the polarization-scrambled signal with the at least the fraction of the optical signal at an output of the optical device to produce a heterodyned signal, the heterodyned signal comprising a radio frequency signal component centered at a beat frequency, the beat frequency being equal to a difference between the local oscillator frequency and a carrier frequency of the optical signal;

(f) analyzing frequency components and polarization components of the radio frequency signal component, including passing a fixed polarization component of the heterodyned signal through an adjustable polarization analyzer set to a fixed position, converting the fixed polarization component of the heterodyned signal to an electrical signal and resolving the frequency components of the fixed polarization component;

(g) generating a set of frequency-resolved states of polarization from the frequency components and polarization components corresponding to the one of the at least two input polarization states; and (h) repeating steps (a) through (g) for each of the at least two input polarization states to generate at least two sets of frequency-resolved states of polarization corresponding to the at least two input polarization states; and (i) calculating the polarization mode dispersion of the optical device from the at least two sets of frequency-resolved states of polarization.

20. The method of claim 19, wherein the optical device comprises a working channel of an optical telecommunication system, the method further comprising the step of tapping the at least the fraction of the optical signal from the working channel for mixing with the polarization-scrambled signal.

21. The method of claim 20, further comprising the steps of:

determining a correction factor for compensating the polarization mode dispersion of the working channel; and applying the correction factor to the optical signal to compensate the polarization mode dispersion in the working channel.

22. The method of claim 19, wherein the polarization controller provides the at least two input polarization states alternatingly in time.

23. The method of claim 22, wherein the at least two input polarization states is at least three input polarization states.

* * * * *